Dec. 3, 1940.    J. P. JOHNSON    2,223,994

CHECK VALVE

Filed March 12, 1938

INVENTOR.
JAMES P JOHNSON
BY
ATTORNEY.

Patented Dec. 3, 1940

2,223,994

UNITED STATES PATENT OFFICE 2,223,994

CHECK VALVE

James P. Johnson, Shaker Heights, Ohio, assignor, by mesne assignments, to Pump Engineering Service Corporation, Cleveland, Ohio, a corporation of Ohio Application March 12, 1938, Serial No. 195,575

3 Claims. (Cl. 251—144)

This invention relates to check valves and more particularly to an improved type designed especially for use on aircraft. It is well known, in the aircraft art, at the present time, that most of the instruments utilized in flying are vacuum operated, that the instruments are delicate and must be accurate in their calculations, therefore, they should be subjected to as little abuse as possible. Under present conditions, the vacuum pump is usually connected directly with the instruments, and as long as the pump operates continuously, the proper vacuum is maintained in the connecting line. If the pump rotor, however, is subjected to a reverse force, however slight, which may result from the back-firing of the motor, a back pressure is created, which reacts upon the instruments and may subsequently cause injury. A back pressure is also created in the line when the motor is started and reacts upon the instruments due to the open line between the vacuum pump and the instruments. By using a one way check valve and mounting it in the line between the vacuum pump and the instruments, the back pressure is immediately checked by the valve, and thereby prevents any reaction upon the instruments.

It is, therefore, an object of the present invention, to provide a check valve of improved construction, which is normally closed but yieldable to the suction of the pump to permit unrestricted flow of fluid from the instruments to the pump but which prevents the flow of fluid in a reverse direction.

Another object of the invention is to provide a check valve of light construction, particularly important in aircraft, which embodies a movable valve member of light material especially reactive to light spring loads.

Another object of the invention is to provide a check valve which has its component parts so arranged and related as to produce a compact structure without reducing its efficiency.

With the objects above indicated, and other objects hereinafter explained in view, my invention consists in the construction and combination of elements hereinafter described and claimed.

Referring to the drawing.

Figure 1:
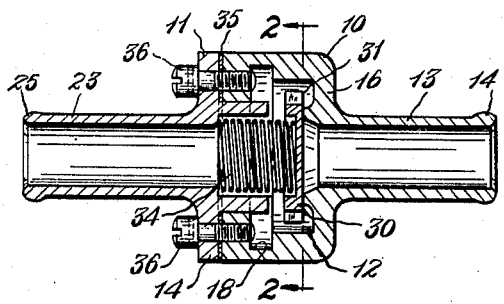
Figure 1 is a longitudinal sectional view of a check valve embodying the present invention.

In the drawing I have illustrated a one way check valve, embodying the present invention, and designed particularly for use on aircraft, but it should be understood that it is capable of other uses and, therefore, not so restricted.

The check valve is preferably made of aluminum, or an alloy thereof, in order to obtain lightness and may be cast or otherwise suitably produced. It comprises two cooperating parts, a body portion 10 and a cover 11 detachably connected thereto. The body portion 10 consists of an enlarged circular portion 12 at one end and formed with an integral tubular extension 13 projecting axially therefrom and of relatively smaller diameter. This extension 13 is adapted to receive one end of a flexible hose, not shown, and is provided with a circumferential bead 14 which assists in maintaining the adjacent end of the hose against accidental displacement. The other end of the hose is suitably connected with the vacuum operated instruments.

The enlarged circular portion 12 is cored out to provide an annular wall 15 and an integral end wall 16 adjacent the extension 13. An inwardly extending circumferential flange 17 is formed at the opposite end of the annular wall 15, and directly adjacent thereto is a circumferential recess 18 formed in the inner portion of the annular wall 15. The end wall 16 is provided with an annular extension 19 formed on its inner surface and said extension is adapted to function as a valve seat. The inner surface of the annular extension 19 is tapered at 20 and terminates at the inner surface of the tubular extension 13. The flange 17 is provided with tapped openings 21 which extend transversely therethrough and are disposed in angularly spaced relation of approximately 90°. While four of such openings are here provided, it should be understood that a greater or lesser number may be used if desired. The flange 17 is, further, provided with four semicircular openings 22 which extend transversely therethrough and each semicircular opening 22 is disposed substantially midway between different adjacent pairs of tapped openings 21 for a purpose to be later described.

The cover 11 consists of a tubular extension 23, similar to the tubular extension 13, and has a laterally extending circumferential flange 24, of a diameter commensurate with the diameter of the annular wall 15 of the body portion 10. The tubular extension 23 is adapted to receive one end of a flexible hose, not shown, and is provided with a circumferential bead 25 which assists in maintaining the adjacent end of the hose against accidental displacement. The other end of the hose is suitably connected with the vacuum pump.

Figure 4:
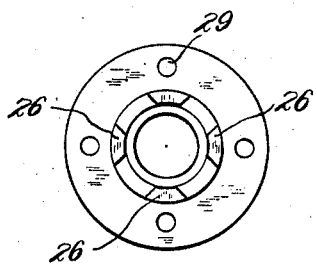
Figure 4 is an end view taken on line 4—4 in Figure 3.
Figure 5:
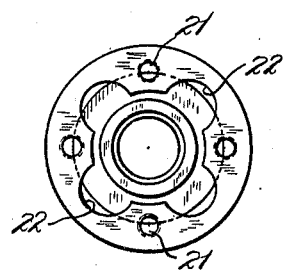
Figure 5 is an end view taken on line 5—5 in Figure 3.

The cover 11 is, originally, provided with an annular extension which projects axially from the flange 24 and terminates substantially adjacent the bottom of the recess 18, as shown in Figure 1. This annular extension may be grooved or slotted, in any well known manner, so as to provide a plurality of arcuate shaped projections 26, disposed in angular spaced relation, as more clearly shown in Figure 4. The bottom of the slots terminate short of the adjacent side of the flange 24 so as to leave a small annular portion 27 of the annular extension and the inside diameter of the latter is slightly greater than the inside diameter of the tubular extension 23 so as to provide a shoulder 28 for a purpose to be later described. The flange 24 is provided with openings 29 which extend transversely therethrough and are disposed in angular relation, in a manner, so as to be in alignment with the tapped openings 21 when the parts are in assembled position. It will, also, be noted in Figure 4, that the openings 29 are located adjacent the arcuate projections 26.

Figure 2:
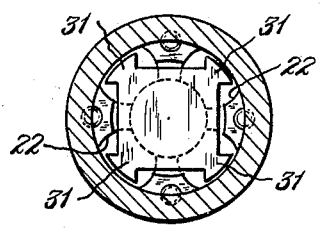
Figure 2 is a transverse sectional view taken on line 2—2 in Figure 1.
Figure 3:
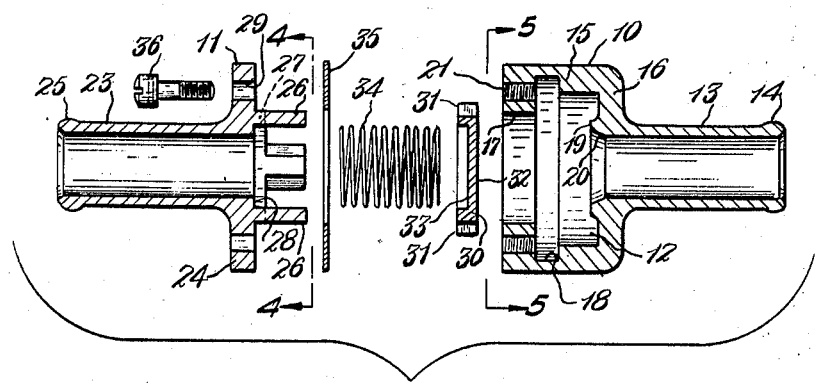
Figure 3 is a longitudinal sectional view, similar to Figure 1, but showing the various parts in extended relation.

A valve member 30 is made preferably of Bakelite, because of its lightness, although other materials of similar character may be used if desired. The shape or contour of the valve member 30 is more clearly shown in Figure 2, and it should be noted that the distance between certain diametrically opposed portions is greater than the distance between opposed flanges 17. The valve member 20 is generally square in plan view, but is provided with arcuate extensions 31 at its diametrically opposite corners. The valve member 30 is relatively thin, having a flat outer surface 32, which is adapted for engagement with the valve seat 19, and an axial bore 33 on its inner surface of substantially the same diameter as the inner diameter of the arcuate projections 26.

A coiled spring 34 has one end seated in the bore 33 of the valve member 30, while its other end is seated in the annular portion 27 in abutment with the shoulder 28 on the cover 11. The spring 34 should have a relatively large diameter and be formed of small gauge wire, with the convolutions so spaced as to afford a very light pressure. In as much as the valve member 30 is made of Bakelite, it will respond quickly to light spring loads, and therefore, will not interfere with the flow of fluid thereby from the vacuum operated instruments to the vacuum pump.

A gasket 35 is disposed between the adjacent surfaces of the flange 24 and flange 17 and is provided with openings which align with the respective openings 29 and 21 in the flanges, and machine screws 36 are used to secure the flanges of the cover 11 and body portion 10 in assembled relation. The screws may be secured against accidental displacement by connecting wires, or in any other well known manner.

In assembling the check valve, the body portion 10 is turned so that its axis is in a vertical position with the flange 17 at the top. The valve member 30 is held in a horizontal position with the bore 33 outwardly and arranged so that the arcuate extensions 31 are directly over the semicircular openings 22 in the flange 17. The valve member is then dropped through the semicircular openings and lands upon the valve seat 19, the arcuate extensions 31 extending substantially to the inner surface of the annular wall 15 in a manner to permit free movement and yet act as a guide in the movement of the valve member. By this arrangement, a relatively large valve member may be used, without having to enlarge the body portion 10.

The spring 34 is next inserted, by lowering one end of the spring until it is seated in the bore 33 of the valve member, the opposite end projecting outwardly slightly beyond the flange 17. The gasket 35 is then positioned upon the flange 17, and the cover 11 is finally applied, by placing the arcuate projections 26 about the outer end of the spring 34 and pressing the cover downwardly so that the arcuate projections 26 slide freely within the opening provided by the flange 17. In the downward movement of the cover 11, the outer end of the spring 34 abuts the shoulder 28, and the cover must be finally moved downwardly against the tension of the spring until the flange 24 engages the gasket 35, at which time the screws 36 are inserted in the openings and tightly screwed into place to maintain the parts in assembled relation.

In using the check valve, it is introduced into the line which connects the vacuum operated instruments with the vacuum pump. The instruments are connected by a suitable flexible tube, with the tubular extension 13 on the body portion 10, while the pump is connected, by a suitable flexible tube, with the tubular extension 23 on the cover 11. When the pump is not operating, the valve member 30 is forcibly maintained on the valve seat 19, by reason of the tension spring 34, and this prevents the flow of any fluid past the check valve from the vacuum pump to the instruments. Likewise, upon starting the motor, any back pressure created by reason of the pump rotor being rotated in its reverse direction, reacts additionally upon the valve member 30 and forces it into engagement with its valve seat. This reaction on the valve member also occurs when the motor back-fires, thus preventing any back pressure from reaching the instruments and resulting in their ultimate damage. On the other hand, when the vacuum pump is operating properly, a suction is created in the line between the pump and instrument, sufficiently to unseat the valve member, and thus permit unrestricted flow of fluid from the instruments to the pump. It will also be noted, that even though the suction on the valve member 30 is sufficient to cause it to engage the adjacent ends of the arcuate projections 26, the flow of fluid is still unrestricted, inasmuch as it is free to pass around the outer edge of the valve member, between the arcuate projections, between the convolutions of the spring, and ultimately through the tubular extension 23.

While I have described the preferred embodiment of the invention it is to be understood that I am not to be limited thereto inasmuch as changes and modifications may be resorted to without departing from the spirit of the invention as defined in the appended claims.

What is claimed is:

1. A one way check valve comprising a body member including an annular wall, a transversely disposed end wall, a tubular inlet projecting axially outwardly from said end wall, an annular extension projecting axially inwardly from said end wall to provide a valve seat, and an inwardly extending circumferential flange at the opposite end of said annular wall providing an axial opening of a diameter smaller than the diameter of the inner surface of said annular wall, said flange being provided with diametrically disposed slots extending outwardly from the axial opening and terminating slightly beyond the inner surface of said annular wall, a relatively thin valve member of light weight material disposed transversely within said annular wall and having one face engageable with said valve seat while the opposite face is provided with an axially disposed bore, said valve member having diametrically disposed extensions projecting outwardly in the plane of the valve member, the free ends of said extensions being spaced from the inner surface of said annular wall to afford free but guiding movement and relatively disposed with respect to the slots on said flange to permit free passage of said valve member therethrough during assembly and disassembly, and a cover member including an attaching flange disposed in abutting relation with respect to the circumferential flange on said body member, a tubular extension projecting axially outwardly from said flange, a plurality of arcuately shaped projections extending axially inwardly from said flange and closely fitting within the axial opening in said circumferential flange, said projections being diametrically spaced apart a distance greater than the diameter of said tubular member whereby to define a shoulder adjacent the end of said cover member and the inner ends of said projections being disposed adjacent to but spaced from said valve member when seated for limiting movement of the latter, and a coiled light tension spring having a portion disposed within said projections and one end in abutment with said shoulder, the other end being disposed within said valve member bore in abutment with the latter whereby the valve member is normally maintained in engagement with its seat, said cover member and housing being detachably connected.

2. A one way check valve comprising a body member including an annular wall, a transversely disposed end wall, a tubular inlet projecting axially outwardly from said end wall, an annular extension projecting axially inwardly from said end wall to provide a valve seat, and an inwardly extending circumferential flange at the opposite end of said annular wall providing an axial opening of a diameter smaller than the diameter of the inner surface of said annular wall, said flange being provided with diametrically disposed slots extending outwardly from the axial opening and terminating slightly beyond the inner surface of said annular wall, a relatively thin substantially square valve member of light weight material disposed transversely within said annular wall and having one face engageable with said valve seat while the opposite face is provided with a centrally disposed bore, said valve member having extensions at its corners projecting outwardly in the plane of the valve member, the free ends of said extensions being spaced from the inner surface of said annular wall to afford free but guiding movement and relatively disposed with respect to the slots on said flange to permit free passage of said valve member therethrough during assembly and disassembly, and a cover member including an attaching flange disposed in abutting relation with respect to the circumferential flange on said body member, a tubular extension projecting axially outwardly from said flange, a plurality of accurately shaped projections extending axially inwardly from said flange and closely fitting within the axial opening in said circumferential flange, pairs of said projections being diametrically opposed and spaced apart a distance greater than the inside diameter of said tubular extension whereby to define a shoulder and the inner ends of said arcuate projections being disposed adjacent to but spaced from said valve member when seated for limiting movement of the latter, and a light coiled spring having a portion disposed within said projections and one end in abutment with said shoulder, the other end being disposed within the bore on said valve member in abutment with the latter whereby the valve member is normally maintained in engagement with its seat, said cover member and housing being detachably connected.

3. A one-way check valve comprising a body member including an annular wall portion, a transversely disposed end wall portion, a tubular inlet portion projecting axially outwardly from said end wall, an annular extension projecting axially inwardly from said end wall providing a valve seat, and a plurality of radially inwardly extending flange-like protuberances adjacent the opposite end of said annular wall, a relatively thin valve member of light weight material disposed transversely within said annular wall and having one face engageable with said valve seat, said valve member being assembled with corner portions thereof passing within the spaces defined by said inwardly extending protuberances, and a cover member including an attaching flange disposed in abutting relation with respect to said annular wall, a tubular extension projecting axially outwardly from said flange, a plurality of arcuately shaped projections extending axially inwardly from said flange and fitting closely in opposed relation to said protuberances, the ends eof the arcuate projection extending inwardly beyond said protuberances and being effective to limit the movement of said valve, and a coil spring having a portion disposed within said projections and serving to normally maintain said valve in engagement with said seat.

JAMES P. JOHNSON.